Patented Dec. 7, 1948

2,455,898

UNITED STATES PATENT OFFICE 2,455,898

LAKES OF BASIC DYESTUFFS

Walter E. Ness, Middlesex, N. J., assignor to American Cyanamid Company, New York, N. Y., a corporation of Maine No Drawing. Application December 10, 1943, Serial No. 513,715

20 Claims. (Cl. 106—289)

1

This invention relates to pigment compositions for intaglio printing inks, particularly rotogravure printing inks containing lakes of basic dyestuffs.

High speed intaglio printing, particularly high speed rotogravure printing, has given rise to a number of problems. Because of the extreme speed of the printing, inks using drying oil varnishes cannot be used efficiently because the ink has to dry almost immediately, frequently by passing the printed sheet rapidly through a flame and, therefore, volatile vehicles have to be used for rapid work. This in turn has raised a series of problems as far as colors are concerned. Many colors which are readily dispersed by grinding in a drying oil will not wet readily with volatile ink vehicles and hence will result in dispersions which are incomplete and give poor tinctorial value on printing. On the other hand, the pigment must not be soluble in the vehicle; otherwise, it bleeds and sharp prints are not readily obtainable.

The above requirements have made the choice of pigments difficult. Many pigments used in printing are lakes; that is to say, water insoluble salts in which either the basic or the acidic component, or both, are colored. Some of the brightest colors are obtained from lakes of basic dyestuffs of the polyarylmethane series; that is to say, dyestuffs of this series which are free from sulfonic groups and which contain amino groups or substituted amino groups. These lakes are often referred to as toners because they are frequently used in connection with carbon black or other pigments to produce changes in tone or shade. Some lakes of basic dyestuffs have been rosinates; that is to say, the salt of the basic dyestuff with abietic and similar rosin acids usually associated with insoluble metal rosinates. These pigment compositions are not entirely satisfactory for rotogravure inks because they are soluble to a considerable extent in the volatile ink vehicles and hence cause bleeding.

Another type of pigment compositions constitutes lakes of the basic dyestuffs with various natural tanning agents. These are probably compounds in the nature of salts and are often prepared with antimony salts which react with the tanning agents to produce antimony complexes. These pigments, while not soluble in the volatile printing ink vehicles are not easily wetted by them, and do not disperse readily or uniformly. Besides they are rather hard and difficult to comminute. They, therefore, produce prints of relatively low tinctorial value.

The present invention is based on the discovery that if the complexes of the basic dyes with natural tanning agents with or without metals such as antimony are extended with water insoluble soaps a product is obtained which is not soluble in the volatile printing ink vehicles but which is readily wetted and dispersed. In other words, a product is obtained which has all of the advantages of lakes of basic dyes with natural tanning agents and lakes with rosin acids and at the same time does not have any of the disadvantages of either. It is thus possible for the first time to produce pigment lakes from basic dyes which can be used in high speed rotogravure printing with full and uniform tinctorial strength and with excellent print sharpness. It is a further advantage of the present invention that the lakes readily blend with other pigments such as carbon black.

While the present invention is not limited to the use of any particular basic polyarylmethane dyestuff, commercially, the most important dyestuffs of this series which can be used in the present invention are methyl violet, the fuchsines, crystal violet, malachite green, brilliant green, rhodamines, the victoria blues, auramine, and the like. Mixtures of various basic dyestuffs are, of course, included and are sometimes used to produce particular shades.

The natural tanning agents of the present invention are in general phenolic compounds and belong either to the class of the condensed non-hydrolyzable tanning agents such as the quebrachos, catechus, etc., or to the class of the hydrolyzable tanning agents such as the tannins, the depsides and glucosides. The acid phenolic groups of the natural tanning agents appear to react with the basic groups of the basic dyestuffs, precipitating them in the form of salt or salt-like bodies, and, as has been stated above the tanning agents are sometimes transformed into heavy metal complexes such as antimony complexes which are also capable of reaction with the basic dyestuff. Throughout the specification and claims the expression "natural tanning agent" is used to cover these phenolic compounds and their metal complexes.

The extenders are insoluble soaps; that is to say, they are polyvalent metal salts of soap-forming acids. These include higher fatty acids, saturated or unsaturated, such as oleic, stearic, palmitic, lauric, myristic, linoleic, and the like; naphthenic acids; rosin acids such as abietic acid, and the like. The metals which form the insoluble soaps are the common ones such as barium, aluminum, zinc, calcium, and the like. While the present invention in its broader aspects is not limited to the use of a particular water insoluble soap, I prefer soaps made from the rosin acids. It is in no sense necessary to use pure soap-forming acids. On the contrary, mixtures such as are obtained from natural products work satisfactorily; thus, for example, rosin is in no sense abietic acid but contains mixtures of rosin acids. The fact that it is not necessary to isolate a particular soap acid for purposes of the present invention is a practical advantage as the cheap mixtures obtainable from natural products may be employed. The method by which the lakes and the insoluble soap extenders are prepared is not critical. There are several methods by which the result may be achieved. The present invention is not limited to any particular method, but I prefer to disperse the toner, that is to say, the compound obtained by reaction of the basic dyestuff with a natural tanning agent or its metal complex in a solution of the alkaline metal salt of the soap-forming acid or acids followed by precipitation of the water insoluble soap by the addition of a water soluble salt of the corresponding polyvalent metal. The soap extender is thus precipitated on the particles of the toner and a very close combination of the two is obtained. At the same time, the covering of the individual pigment particles by the soap tends to prevent agglomeration in subsequent use and this is an additional advantage of the product of the present invention when prepared by this preferred method.

Other methods of incorporating the insoluble soap with the toner may be employed. Thus, for example, the toner may be dispersed in an aqueous solution of the polyvalent metal and the soap solution may then be added to this dispersion. It is also possible to prepare the water insoluble soap separately and mix it with the toner by various dispersing and blending means.

It is a further advantage of the present invention that the normal methods of preparing the toners prior to combination with the water insoluble soaps are not materially affected by the present invention and standard methods and equipment may, therefore, be used. It will be apparent, of course, that it is just as desirable to produce the toner in the form of finely divided particles to give good tinctorial strength when it is to be incorporated in compositions of the present invention as it is when the toner is to be used for other purposes. The initial particle size of the toner determines to a considerable extent the strength of the rotogravure ink pigment finally obtained, and it is an advantage of the present invention that when toners of fine particle size are prepared the incorporation of the metal soap does not cause agglomeration and in fact the preferred method of the present invention actually prevents subsequent agglomeration. The present invention, therefore, presents an instance where valuable new properties are given to an old product without any disadvantages. The new results are obtained with no compromises of quality or economical production.

The invention will be described in connection with the following specific examples, the parts being by weight.

*Example 1*

330 parts of quebracho are dissolved in boiling water. 43 parts of antimony in the form of tartar emetic (potassium antimonyl tartrate) are added with stirring until a uniform dispersion of the antimony complex of the quebracho is obtained. The dispersion of the complex tanning agent is then run into 235 parts of methyl violet, CI-680, in the form of an aqueous solution maintained at about 70° C. A precipitate results, the toner being obtained in the form of an aqueous slurry to which is added rosinate prepared by boiling 675 parts of W. W. wood rosin with an aqueous solution of 121 parts of caustic soda and 13.5 parts of soda ash. After thorough incorporation of the sodium rosinate with the slurry of the toner 280 parts of barium chloride dihydrate in the form of a 10% aqueous solution is added with stirring. The lake produced is filtered and dried at 80° C., preferably under reduced pressure. The dry product is then ground and is a fugitive violet toner capable of incorporation in high speed intaglio inks.

*Example 2*

300 parts of quebracho are dissolved in boiling water; the solution of tanning agent is then run into 235 parts of Brilliant Green C. I. 662, in the form of an aqueous solution maintained at about 70° C. A precipitate results, the toner being obtained in the form of an aqueous slurry to which is added rosinate prepared by boiling 675 parts of W. W. wood rosin with an aqueous solution of 121 parts of caustic soda and 13.5 parts of soda ash. After thorough incorporation of the sodium rosinate with the slurry of the toner 280 parts of barium chloride dihydrate in the form of a 10% aqueous solution is added with stirring. The lake produced is filtered and dried at 80° C. preferably under reduced pressure. The dry product is then ground and is a fugitive green toner capable of incorporation in high speed intaglio inks.

*Example 3*

405 parts of quebracho are dissolved in boiling water. The solution of the tanning agent is then run into 235 parts of Para fuchsine, C. I. 676, in the form of an aqueous solution maintained at about 70° C. A precipitate results, the toner being obtained in the form of an aqueous slurry. To this is added, with stirring, a water solution of 53 parts of antimony in the form of tartar emetic (potassium antimonyl tartrate), in order to obtain a more complete precipitation of the dyestuff. To this slurry is added an aqueous solution of 600 parts sodium oleate. After thorough incorporation of the sodium oleate with the slurry of the toner 250 parts of barium chloride dihydrate in the form of a 10% aqueous solution is added with stirring. The lake produced is filtered and dried at 60° C. The dry product is then ground and is a fugitive red toner capable of incorporation in high speed intaglio inks.

*Example 4*

460 parts of tannic acid are dissolved in boiling water. The solution of the tanning agent is then run into 235 parts of Rhodamine B, C. I. 749, in the form of an aqueous solution maintained at about 70° C. A precipitate results, the toner being obtained in the form of an aqueous slurry. To this is added, with stirring, a water solution of 35 parts of antimony in the form of tartar emetic (potassium antimonyltartrate) in order to obtain a more complete precipitation of the dyestuff. To this slurry is added sodium rosinate prepared by boiling 740 parts of W. W. wood rosin with an aqueous solution of 133 parts of caustic soda and 14.8 parts of soda ash. After thorough incorporation of the sodium rosinate with the slurry of the toner 308 parts of barium chloride dihydrate in the form of a 10% aqueous solution is added with stirring. The lake produced is filtered and dried at 75-80° C. preferably under reduced pressure. The dry product is then ground by passing through a Mikromill and is a fugitive red toner capable of incorporation in high speed intaglio inks.

*Example 5*

680 parts of tannic acid are dissolved in boiling water. The solution of the tanning agent is then run into 235 parts of Auramine, C. I. 655, in the form of an aqueous solution maintained at about 70° C. A precipitate results, the toner being obtained in the form of an aqueous slurry to which is added an aqueous solution of 675 parts sodium oleate. After thorough incorporation of the sodium oleate with the slurry of the toner 280 parts of barium chloride dihydrate in the form of a 10% aqueous solution is added with stirring. The lake produced is filtered and dried at 60° C. preferably under reduced pressure. The dry product is then ground and is a fugitive yellow toner capable of incorporation in high speed intaglio inks.

I claim:

1. A pigment composition suitable for intaglio printing comprising a reaction product of a basic polyarylmethane dyestuff with a natural tanning agent, and a water insoluble polyvalent metal salt of at least one soap-forming acid.

2. A pigment composition suitable for intaglio printing comprising a reaction product of a basic polyarylmethane dyestuff with a metal complex of a natural tanning agent, and a water insoluble polyvalent metal salt of at least one soap-forming acid.

3. A pigment composition suitable for intaglio printing comprising a reaction product of a basic polyarylmethane dyestuff with an antimony complex of a natural tanning agent, and a water insoluble polyvalent metal salt of at least one soap-forming acid.

4. A pigment composition suitable for intaglio printing comprising a reaction product of a basic triarylmethane dyestuff with a natural tanning agent, and a water insoluble polyvalent metal salt of at least one soap-forming acid.

5. A pigment composition suitable for intaglio printing comprising a reaction product of a basic triarylmethane dyestuff with a metal complex of a natural tanning agent, and a water insoluble polyvalent metal salt of at least one soap-forming acid.

6. A pigment composition suitable for intaglio printing comprising a reaction product of a basic triarylmethane dyestuff with an antimony complex of a natural tanning agent, and a water insoluble polyvalent metal salt of at least one soap-forming acid.

7. A pigment composition suitable for intaglio printing comprising a reaction product of a basic polyarylmethane dyestuff with a quebracho tanning agent, and a water insoluble polyvalent metal salt of at least one soap-forming acid.

8. A pigment composition suitable for intaglio printing comprising a reaction product of a basic polyarylmethane dyestuff with a metal complex of a quebracho tanning agent, and a water insoluble polyvalent metal salt of at least one soap-forming acid.

9. A pigment composition suitable for intaglio printing comprising a reaction product of a basic polyarylmethane dyestuff with an antimony complex of a quebracho tanning agent, and a water insoluble polyvalent metal salt of at least one soap-forming acid.

10. A pigment composition suitable for intaglio printing comprising a reaction product of methyl violet dyestuff with a natural tanning agent, and a water insoluble polyvalent metal salt of at least one soap-forming acid.

11. A composition according to claim 1 in which the polyvalent metal salt of a soap-forming acid is a water insoluble polyvalent metal rosinate.

12. A composition according to claim 2 in which the polyvalent metal salt of a soap-forming acid is a water insoluble polyvalent metal rosinate.

13. A composition according to claim 3 in which the polyvalent metal salt of a soap-forming acid is a water insoluble polyvalent metal rosinate.

14. A composition according to claim 4 in which the polyvalent metal salt of a soap-forming acid is a water insoluble polyvalent metal rosinate.

15. A composition according to claim 5 in which the polyvalent metal salt of a soap-forming acid is a water insoluble polyvalent metal rosinate.

16. A composition according to claim 6 in which the polyvalent metal salt of a soap-forming acid is a water insoluble polyvalent metal rosinate.

17. A composition according to claim 7 in which the polyvalent metal salt of a soap-forming acid is a water insoluble polyvalent metal rosinate.

18. A composition according to claim 8 in which the polyvalent metal salt of a soap-forming acid is a water insoluble polyvalent metal rosinate.

19. A composition according to claim 9 in which the polyvalent metal salt of a soap-forming acid is a water insoluble polyvalent metal rosinate.

20. A composition according to claim 10 in which the polyvalent metal salt of a soap-forming acid is a water insoluble polyvalent metal rosinate.

WALTER E. NESS.

REFERENCES CITED

The following references are of record in the file of this patent:

UNITED STATES PATENTS

| Number | Name | Date |
|---|---|---|
| 2,350,520 | O'Neal | June 6, 1944 |
| 2,107,159 | Martone | Feb. 1, 1938 |

FOREIGN PATENTS

| Number | Country | Date |
|---|---|---|
| 17,635 | Great Britain | 1891 |